(12) United States Patent
Lin et al.

(10) Patent No.: US 12,360,933 B2
(45) Date of Patent: Jul. 15, 2025

(54) DETECTION SYSTEM SENDING CALCULATED DATA AND RAW DATA

(71) Applicant: PIXART IMAGING INC., Hsin-Chu County (TW)

(72) Inventors: Yao-Hsuan Lin, Hsin-Chu County (TW); Bo-Yi Chang, Hsin-Chu County (TW); Sheng-Hung Wang, Hsin-Chu County (TW); Yu-Chen Fu, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 29 days.

(21) Appl. No.: 17/541,256

(22) Filed: Dec. 3, 2021

(65) Prior Publication Data

US 2023/0176988 A1 Jun. 8, 2023

(51) Int. Cl.
*G06F 13/40* (2006.01)
*G06F 13/42* (2006.01)

(52) U.S. Cl.
CPC ...... *G06F 13/4027* (2013.01); *G06F 13/4282* (2013.01); *G06F 2213/0016* (2013.01)

(58) Field of Classification Search
None
See application file for complete search history.

(56) References Cited

U.S. PATENT DOCUMENTS

| | | | | |
|---|---|---|---|---|
| 8,988,223 B2* | 3/2015 | Puleston | ............. | G06F 13/4282 707/609 |
| 9,417,821 B2* | 8/2016 | Slaight | ................. | G06F 3/0646 |
| 10,313,164 B2* | 6/2019 | Mody | ................. | G06F 3/0485 |
| 10,478,128 B2* | 11/2019 | Gu | ......... | G16H 40/63 |
| 10,506,013 B1* | 12/2019 | Brown | ............... | G06F 13/4221 |
| 10,761,938 B2* | 9/2020 | Pillilli | ................ | G06F 11/1441 |
| 10,949,365 B2* | 3/2021 | Jacobs | ............... | G06F 13/4282 |
| 10,956,346 B1* | 3/2021 | Ben-Yehuda | ....... | G06F 13/4027 |
| 10,977,201 B1* | 4/2021 | McKay | .................... | G06F 13/28 |
| 11,159,408 B2* | 10/2021 | Svennebring | ......... | H04L 41/147 |
| 11,199,853 B1* | 12/2021 | Afrouzi | ................. | B25J 13/006 |
| 11,321,259 B2* | 5/2022 | Colenbrander | ..... | G06F 13/4221 |
| 11,369,316 B2* | 6/2022 | Gu | ....... | A61B 5/7257 |
| 11,855,366 B2* | 12/2023 | Ashrafi | .................... | H01Q 25/04 |
| 11,994,751 B1* | 5/2024 | Wagner | .................. | G02C 5/146 |
| 2018/0095832 A1* | 4/2018 | Pillilli | .................... | G06F 9/4403 |
| 2019/0320515 A1* | 10/2019 | Sadwick | ............... | H05B 45/00 |
| 2019/0370635 A1* | 12/2019 | Wen | ....... | G06V 10/82 |
| 2019/0385057 A1* | 12/2019 | Litichever | .............. | H04L 63/14 |
| 2021/0142146 A1* | 5/2021 | Kale | ................ | G06V 10/82 |
| 2021/0217406 A1* | 7/2021 | Jang | .................... | G10L 15/063 |
| 2021/0344117 A1* | 11/2021 | Ashrafi | ................ | H04J 11/0036 |
| 2021/0350237 A1* | 11/2021 | Litichever | ............... | G06N 3/08 |
| 2021/0350550 A1* | 11/2021 | Stengel | .................. | G06V 40/19 |

(Continued)

*Primary Examiner* — Henry Tsai
*Assistant Examiner* — Christopher A Bartels
(74) *Attorney, Agent, or Firm* — HAUPTMAN HAM, LLP

(57) ABSTRACT

There is provided a detection system including a detection device and a post processor. The detection device and the post processor exchange data therebetween using a predetermined communication protocol. The detection device outputs at least one of calculated data and raw data to the post processor in response to each polling according to a request from the post processor. The raw data is provided to the post processor for the machine learning.

18 Claims, 4 Drawing Sheets

(56) References Cited

U.S. PATENT DOCUMENTS

| | | | | |
|---|---|---|---|---|
| 2021/0357742 | A1* | 11/2021 | Restuccia | G06N 3/063 |
| 2021/0374384 | A1* | 12/2021 | Munkberg | G06N 3/045 |
| 2022/0113395 | A1* | 4/2022 | Lee | H04W 4/021 |
| 2022/0126453 | A1* | 4/2022 | Corcodel | B25J 9/1612 |
| 2022/0187841 | A1* | 6/2022 | Ebrahimi Afrouzi | |
| | | | | G05D 1/0242 |
| 2022/0313369 | A1* | 10/2022 | Oberkircher | A61B 34/37 |
| 2022/0318179 | A1* | 10/2022 | Morgan | H02H 9/02 |
| 2022/0392062 | A1* | 12/2022 | Chavez Badiola | G06V 10/26 |
| 2023/0101853 | A1* | 3/2023 | Kodandaramaiah | C12M 21/08 |
| | | | | 435/395 |
| 2023/0385985 | A1* | 11/2023 | Kothandaraman | G06T 3/4084 |
| 2024/0120859 | A1* | 4/2024 | Schmitz-Galow | H02K 11/33 |
| 2024/0192690 | A1* | 6/2024 | Ebrahimi Afrouzi | |
| | | | | B25J 13/087 |
| 2024/0248463 | A1* | 7/2024 | Mohammed | G05B 19/41875 |
| 2025/0053284 | A1* | 2/2025 | Mannor | G06F 3/04845 |

\* cited by examiner

DETECTION SYSTEM SENDING CALCULATED DATA AND RAW DATA

BACKGROUND

1. Field of the Disclosure

This disclosure generally relates to a detection system and, more particularly, to a detection system capable of sending calculated data and raw data according to a request from a post processor, wherein the raw data is for the post processor to perform the machine learning.

2. Description of the Related Art

The conventional mouse device simply outputs, during operation, calculated displacement to the backend for corresponding controls, e.g., moving a cursor on a screen. However, the machine learning is currently used in various applications, and thus it becomes a requirement that the mouse device is able to perform the machine learning according to the image data so as to improve the application of the mouse device.

Accordingly, the present disclosure provides a detection system capable of transmitting at least one of calculated data and raw data to a post processor in response to the polling according to a request from the post processor.

SUMMARY

The present disclosure provides a detection system including a detection device capable of transmitting both calculated data and raw data to a post processor in response to polling after receiving a request from the post processor.

The present disclosure provides a detection system including a detection device and a post processor. The detection device is configured to transmit at least one of calculated data and raw data via a first communication interface. The post processor is configured to transmit a first request or a second request to the first communication interface via a second communication interface to cause the detection device to transmit the calculated data in response to the first request and to transmit the raw data after receiving the second request.

The present disclosure further provides a detection system including a detection device and a post processor. The detection device is configured to transmit at least one of calculated data and raw data via a first communication interface. The post processor includes a first processor core and a second processor core. The first processor core is configured to transmit, at a predetermined frequency, a first request or a second request to the first communication interface via a second communication interface to cause the detection device to transmit the calculated data in response to the first request and to transmit the raw data after receiving the second request. The first processor core is configured to transmit the second request after receiving a third request from the second processor core.

The present disclosure further provides a detection system including a detection device and a post processor. The detection device includes a first communication interface and a memory. The first communication interface is configured to transmit at least one of calculated data and raw data. The memory is configured to temporarily store the raw data. The post processor is configured to transmit, at a predetermined frequency, a first request or a second request to the first communication interface via a second communication interface to cause the detection device to transmit, via the first communication interface, the calculated data to the post processor in response to the first request, store the raw data into the memory in response to the second request, and transmit, via the first communication interface, a part of the raw data to the post processor respectively in response to multiple first requests transmitted after the second request.

In the present disclosure, the detection device and the post processor exchange data therebetween using inter-integrated circuit (I2C) communication protocol, serial peripheral interface (SPI) communication protocol, or vender defined protocol.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

Figure 1:
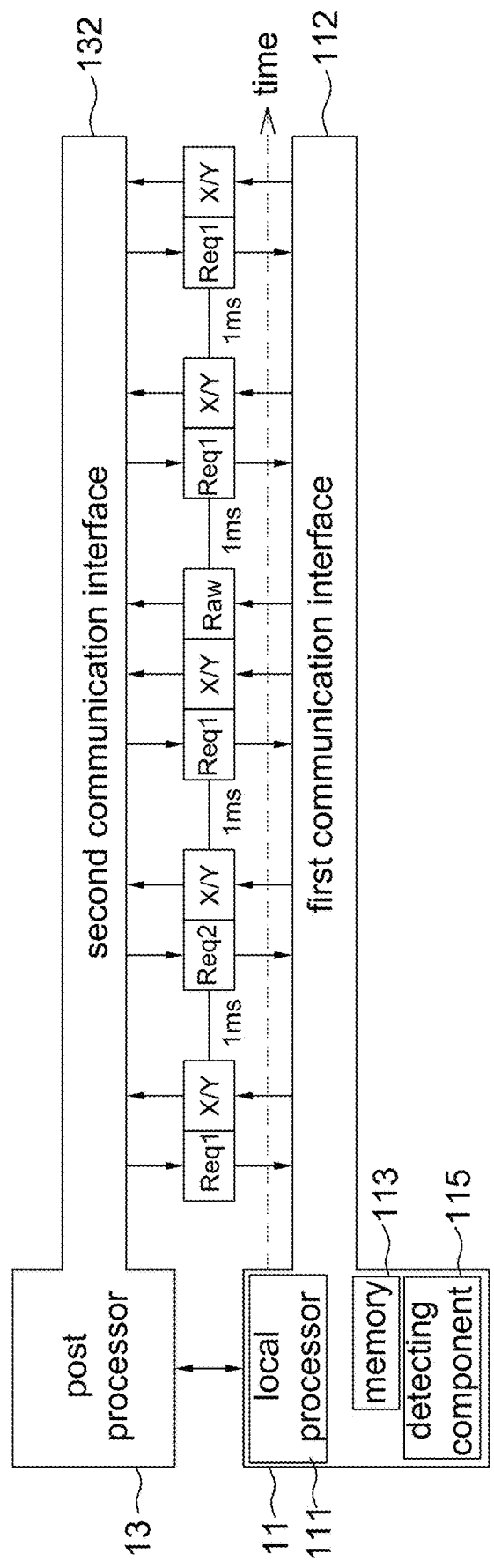
FIG. 1 is an operational schematic diagram of a detection system according to a first embodiment of the present disclosure.

It should be noted that, wherever possible, the same reference numbers will be used throughout the drawings to refer to the same or like parts.

The present disclosure is applicable to a detection device/system having the function of machine learning, e.g., an optical mouse, a smart watch, a smart bracelet and a cleaning robot, but not limited to.

The detection system of the present disclosure includes a detection device and an external processor (or called post processor). Corresponding to different applications, the post processor and the detection device are arranged in the same equipment or respectively arranged in different equipment coupled to each other.

For example, in an application that the detection system is a cleaning robot, the post processor and the detection device are both arranged inside the cleaning robot, wherein the post processor is a micro controller unit or a central processing unit of the cleaning robot.

For example, in an application that the detection device is an optical mouse, the post processor is arranged in a host (e.g., a desktop computer, a notebook computer or the like) to communicate with the optical mouse via a wired or a wireless communication interface, but outside the optical mouse.

For example, in an application that the detection device is a smart watch or a smart bracelet (e.g., having physiological detection function), the post processor is arranged in a smart phone or a tablet computer coupled to (e.g., via wireless communication interface) the smart watch or the smart bracelet, but outside the smart watch or the smart bracelet.

In the present disclosure, the post processor performs the machine learning (e.g., using convolution neural network, but not limited to) according to the raw data sent from the detection device so as to perform the lift-up detection (e.g., in the application of mouse device), the material recognition of working surface (e.g., in the application of mouse device and cleaning robot), the skin color recognition (e.g., in the application of smart watch or smart bracelet) or the like according to different applications.

More specifically, in addition to calculating displacement or a heartrate, used as the calculated data, by a local processor (e.g., a field programmable gate array, an application specific integrated circuit, a digital signal processor or the like) of the detection device according to raw data acquired by a detecting component (e.g., a CMOS image sensor, a CCD image sensor or the like) thereof, the detection device of the present disclosure further transmits, via a communication interface thereof, the raw data to the post processor to allow the post processor to be able to perform the machine learning using the received raw data. The method of calculating the displacement (e.g., comparing different image frames) and the heartrate (e.g., using PPG signal in time domain or frequency domain) is known to the art and not a main objective of the present disclosure, and thus details thereof are not described herein.

In the present disclosure, while raw data is not required (e.g., without receiving any request) to be sent to the post processor, the raw data is selected to be abandoned without being stored after the calculated data is obtained by the local processor so as to reduce operating power consumption. The raw data is stored in a memory of the detection device only when the raw data is required (e.g., receiving a request) to be sent to the post processor.

Please refer to FIG. 1, it is an operational schematic diagram of a detection system 100 according to a first embodiment of the present disclosure. The detection system 100 includes a detection device 11 and a post processor 13, which are coupled to each other using a predetermined communication interface.

The detection device 11 includes a first communication interface 112 and a memory 113, and transmits at least one of calculated data and raw data via the first communication interface 112. In FIG. 1, the calculated data is indicated by "X/Y" and the raw data is indicated by "Raw". The calculated data, e.g., including displacement, a heartrate or other physiological information, is obtained/calculated by a local processor 111 of the detection device 11 according to the raw data acquired by a detecting component 115 thereof (e.g., optical sensor).

The post processor 13 transmits, via a second communication interface 132 thereof, a first request Req1 or a second request Req2 at a predetermined frequency (e.g., shown as every 1 ms, but not limited to) to the first communication interface 112 to cause the detection device 11 to transmit the calculated data X/Y in response to the first request Req1 and transmit the raw data Raw after receiving the second request Req2.

In this embodiment, the post processor 13 sends the second request Req2 only when requiring raw data Raw to perform the machine learning.

In this embodiment, the first communication interface 112 and the second communication interface 132 are SPI communication interfaces, I2C communication interfaces or other communication interfaces for bi-directional communication between processors without particular limitations. The first request Req1 and the second request Req2 are standard communication protocols conforming to the employed communication standard, or self-defined protocols without particular limitations as long as they are recognizable by the first communication interface 112 and the second communication interface 132.

In one aspect, a memory (e.g., including volatile memory and/or non-volatile memory) 113 of the detection device 11 is stored with the latest raw data Raw (e.g., image frame, but not limited to). After receiving the second request Req2, the detection device 11 transmits the raw data Raw to the post processor 13 via the first communication interface 112 and the second communication interface 132.

In another aspect, the memory 113 of the detection device 11 temporarily stores the raw data Raw only after the detection device 11 receives the second request Req2. After receiving the second request Req2, the detection device 11 transmits, via the first communication interface 112 and the second communication interface 132, the raw data Raw to the post processor 13 in response to a next first request Req1 (e.g., shown after 1 ms, an example of a polling period).

In one aspect, the detection device 11 transmits calculated data X/Y and raw data Raw to the post processor 13 in response to a next first request Req1, shown as the third polling in FIG. 1. In another aspect, the detection device 41 transmits the raw data Raw without transmitting the calculated data X/Y to the post processor 43 in response to the next first request Req1, shown as the third polling in FIG. 4.

Figure 2:
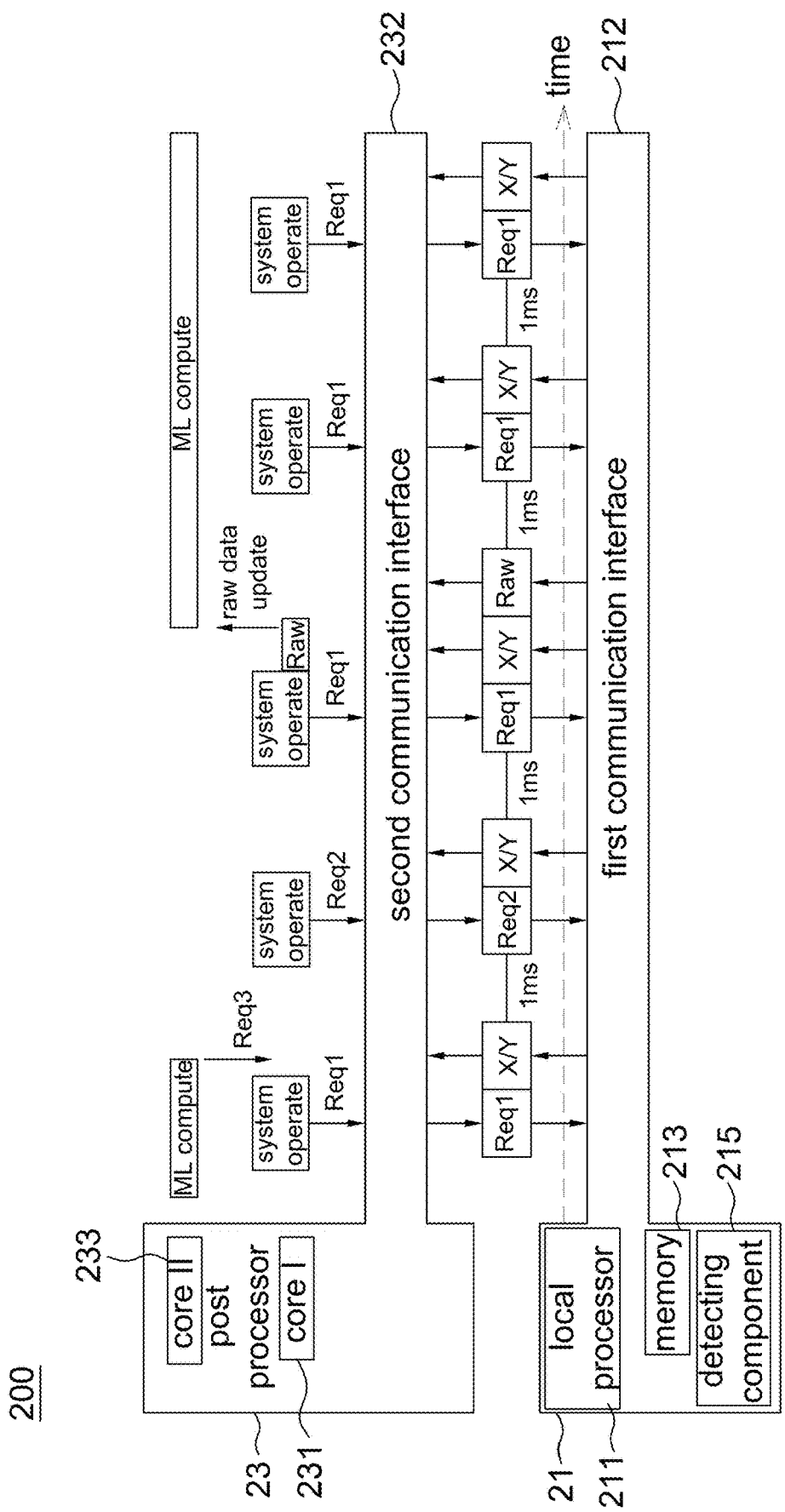
FIG. 2 is an operational schematic diagram of a detection system according to a second embodiment of the present disclosure.

Please refer to FIG. 2, it is an operational schematic diagram of a detection system 200 according to a second embodiment of the present disclosure. The detection system 200 includes a detection device 21 and a post processor 23, which are coupled to each other using a predetermined communication interface.

The detection device 21 also includes a first communication interface 212 and a memory (e.g., including volatile memory and/or non-volatile memory) 213, and transmits at least one of calculated data and raw data via the first communication interface 212. In FIG. 2, "X/Y" indicates calculated data, and "Raw" indicates raw data. Similarly, the calculated data is obtained or calculated by a local processor 211 thereof according to the raw data acquired by a detecting component 215 (e.g., optical sensor) of the detection device 21.

The difference between the second embodiment and the first embodiment is that the post processor 23 of the second embodiment is a two-core processor, which includes a first processor core 231 for communicating with the detection device 21 and receiving the calculated data X/Y and the raw data Raw (shown as system operate). The post processor 23 further includes a second processor core 233 for performing the machine learning computation (shown as ML compute). In one aspect, the second processor core 233 is replaced by a neural processing unit (NPU) or a machine learning accelerator.

As shown in FIG. 2, the first processor core 231 transmits, via a second communication interface 232, a first request Req1 or a second request Req2 at a predetermined frequency (e.g., shown as per 1 ms, but not limited to) to the first communication interface 212 to cause the detection device 21 to transmit the calculated data X/Y in response to the first request Req1 and to transmit the raw data Raw after receiving the second request Req2.

Similar to the above first embodiment, the detection device 21 transmits the raw data Raw in the same polling interval of receiving the second request Req2, or transmits, via the first communication interface 212 and the second communication interface 232, the raw data Raw to the first processor core 231 of the post processor 23 in response to a next first request Req1, shown as the third polling in FIG. 2.

Similarly, in one aspect the detection 21 sends the calculated data X/Y and the raw data Raw to the first processor core 231 of the post processor 23 in response to the next first request Req1 as shown in FIG. 2. In another aspect, the detection device 21 sends only the raw data Raw, without sending the calculated data X/Y, to the first processor core 231 of the post processor 23 in response to the next first request Req1 shown as the third polling in FIG. 4.

Furthermore, because the post processor 23 is a two-core processor in the second embodiment, the first processor core 231 transmits the second request Req2 to the detection device 21 only after receiving a third request Req3 from the second processor core 233. After receiving the raw data Raw from the detection device 21, the first processor core 231 transmits the raw data Raw to the second processor core 233 to update the raw data therein.

The second processor core 233 transmits the third request Req3 to the first processor core 231 only when requiring raw data to perform the machine learning. When the second processor core 233 is in machine learning operation, the second communication interface 232 sends only the first request Req1, without sensing the second request Req2, to the first communication interface 212, as shown in FIG. 2. The first request Req1, the second request Req2 and the third request Req3 are formed by different coding.

Similarly, the first communication interface 212 and the second communication interface 232 are SPI communication interfaces, I2C communication interfaces or other communication interfaces for bi-directional communication between processors without particular limitations. The first request Req1, the second request Req2 and the third request Req3 are standard communication protocols conforming to the employed communication standard, or self-defined protocols without particular limitations as long as they are recognizable by the first communication interface 212, the second communication interface 232 and the post processor 23.

Figure 3:
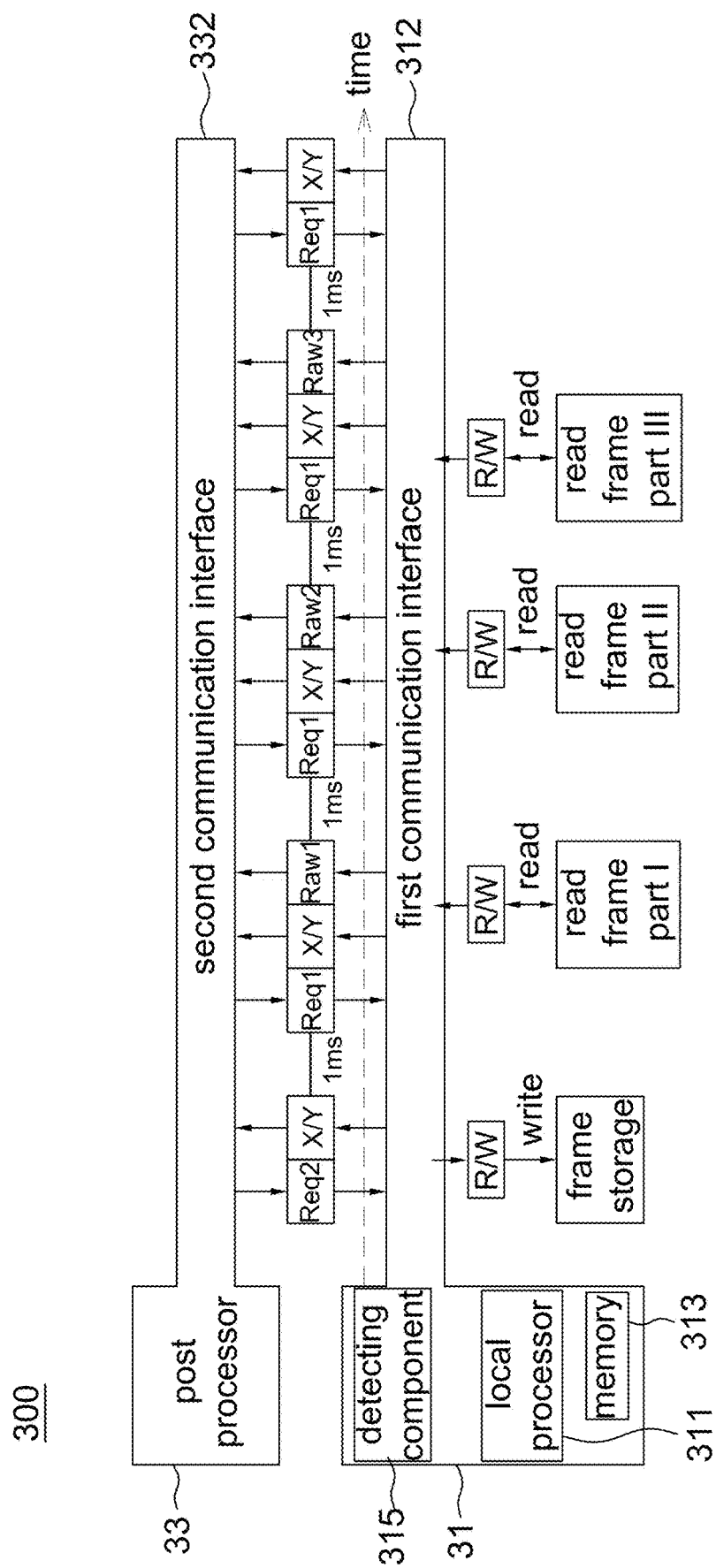
FIG. 3 is an operational schematic diagram of a detection system according to a third embodiment of the present disclosure.

Please refer to FIG. 3, it is an operational schematic diagram of a detection system 300 according to a third embodiment of the present disclosure. The detection system 300 includes a detection device 31 and a post processor 33, which are coupled to each other with a predetermined communication interface.

The detection device 31 also includes a first communication interface 312 and a memory (e.g., including volatile memory and/or non-volatile memory) 313. The first communication interface 312 transmits at least one of calculated data X/Y and raw data (e.g., shown as Raw1, Raw2, Raw3). The memory 313 temporarily stores the raw data, wherein Raw1, Raw2 and Raw3 are respectively a part of the raw data. For example, the raw data is the data acquired by the detection device 31 by a detecting component 315 (e.g., optical sensor, but not limited to) thereof within a frame period. The detection device 31 dispersedly transmits the raw data to the post processor 33.

The difference between the third embodiment and the above first and second embodiments is that in the third embodiment, the detection device 31 responds a part of raw data, e.g., Raw1, Raw2, Raw3, stored in the memory 313 in response to each polling as shown in FIG. 3. Meanwhile, the third embodiment is combinable to the above first and second embodiments. For example in FIG. 1, the detection device 11 respectively transmits a part of raw data stored in the memory 113 at the fourth and the fifth polling. For example in FIG. 2, the detection device 21 respectively transmits a part of raw data stored in the memory 213 at the fourth and the fifth polling.

The post processor 33 transmits, via the second communication interface 332, a first request Req1 or a second request Req2 to the first communication interface 312 at a predetermined frequency (shown as every 1 ms, but not limited to) to cause the detection device 31 to transmit calculated data X/Y in response to the first request Req1, to write the raw data (e.g., acquired by the detecting component) into the memory 313 in response to the second request Req2, and to respectively read and transmit a part of the stored raw data, e.g., shown as Raw1, Raw2, Raw3, in response to multiple first requests Req1 (e.g., showing three times, and a real number of times being determined according to the size of raw data and polling rate without being limited to that shown herein).

Similar to the above first embodiment, in one aspect the detection device 31 starts to transmit a first part of raw data at the same polling of receiving the second request Req2. In another aspect, the detection device 31 starts to sequentially transmit different parts, e.g., Raw1, Raw2, Raw3, of the raw data to the post processor 33 via the first communication interface 312 and the second communication interface 332 in response to next first request(s) Req1, as shown in FIG. 3. That is, the first communication interface 312 stores the latest raw data into the memory 313 (shown as frame storage) after receiving the second request Req2, and sequentially reads every part of stored raw data (shown as read frame part I, read frame part II, read frame part III) from the memory 313 in response to multiple first requests (shown as the second to the fourth polling). The detection device 31 does not store raw data acquired by the detecting component thereof to the memory 313 if the second request Req2 is not received.

Similarly, the first communication interface 312 and the second communication interface 332 are SPI communication interfaces, I2C communication interfaces or other communication interfaces for bi-directional communication between processors without particular limitations. The first request Req1 and the second request Req2 are standard communication protocols conforming to the employed communication standard, or self-defined protocols without particular limitations as long as they are recognizable by the first communication interface 312 and the second communication interface 332.

Figure 4:
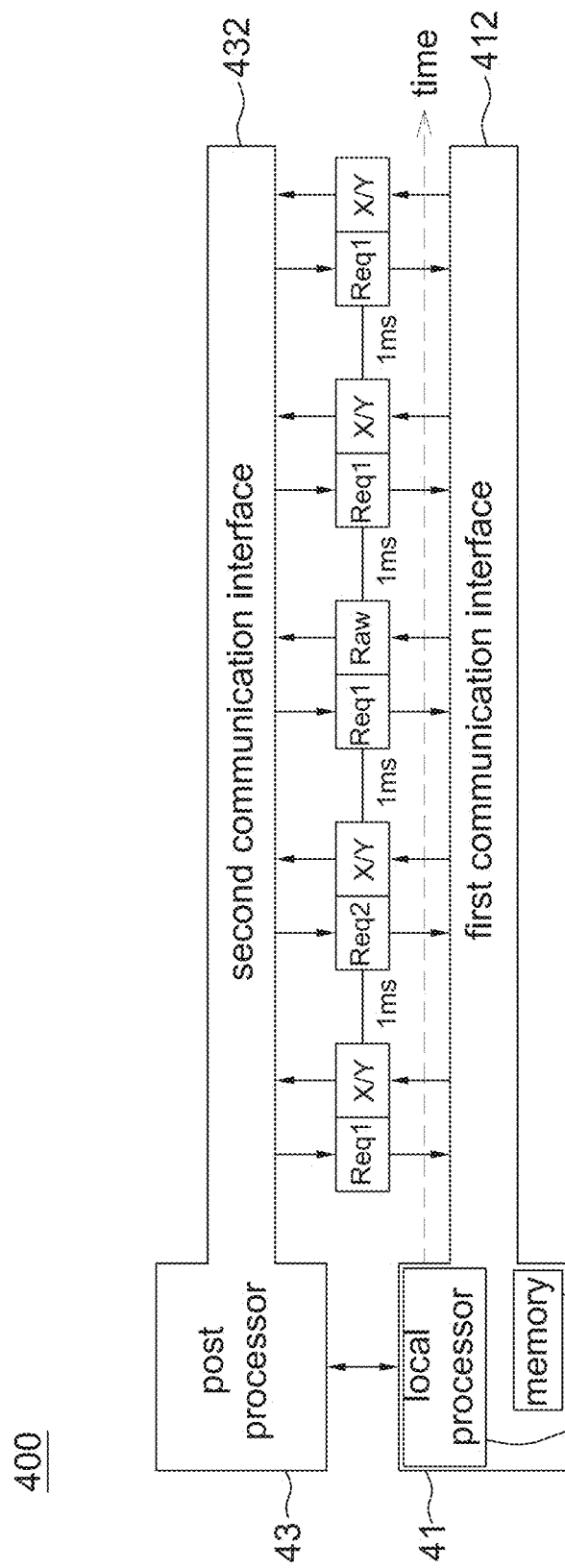
FIG. 4 is an operational schematic diagram of a detection system according to a fourth embodiment of the present disclosure.

Please refer to FIG. 4, it is an operational schematic diagram of a detection system 400 according to a fourth embodiment of the present disclosure. The detection system 400 includes a detection device 41 and a post processor 43.

FIG. 4 shows that in the fourth embodiment the detection device 41 transmits raw data Raw without transmitting calculated data X/Y in the same polling interval to the post processor 43 after receiving the second request Req2. For example in the scenario that the detection device 41 is lifted up from a working surface, the calculated data X/Y is not required.

The fourth embodiment is combinable to the above first to third embodiments. For example in FIG. 1, the detection device 11 sends only the raw data Raw without sending the calculated data X/Y at the third polling. For example in FIG. 2, the detection device 21 sends only the raw data Raw without sending the calculated data X/Y at the third polling. For example in FIG. 3, the detection device 31 sends only the raw data Raw1, Raw2, Raw3 without sending the calculated data X/Y at the second to the fourth polling.

It should be mentioned that although the above embodiments are described in the way that the post processor transmits a single second request Req2 to inform the detection device to respond or transmit raw data, the present disclosure is not limited thereto. In another aspect, the detection device is arranged to transmit raw data after receiving more than one second request or after receiving a combination of different requests, formed by different codes.

It is appreciated that in the above embodiments, the detection devices 11 to 41 are described by a gaming mouse as an example, but the present disclosure is not limited thereto. The detection devices 11 to 41 are selected from a cleaning robot, a smart watch, a smart bracelet according to different applications, and thus the polling rate is different corresponding to different applications without being limited to 1 ms shown herein. In addition, the post processors 13 to 43 are selected from MCU or CPU, but not limited to. In one aspect, the post processor herein does not calculate the calculated data according to raw data.

As mentioned above, the conventional mouse device does not output raw data to a post processor together with outputting calculated data such that applications of the detection system are limited. Accordingly, the present disclosure further provides a detection system capable of performing machine learning (e.g., FIGS. 1-4), whose detection device outputs raw data to the post processor for the machine learning in response to subsequent polling(s) after receiving a request for requiring raw data from the post processor so as to improve the application of a detection system and the user experience as well.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A detection system, comprising:
   a detection device, configured to send out, via a first communication interface included in the detection device, calculated data generated by the detection device, and send out, via the first communication interface included in the same detection device, raw data acquired by an optical sensor of the same detection device; and
   a post processor, configured to transmit a first request, at a predetermined frequency, and a second request to the first communication interface of the detection device via a second communication interface included in the post processor to cause the detection device to transmit the calculated data in response to the first request and to transmit the raw data always in a next polling period of the second request upon the same detection device receiving the second request from the post processor,
   wherein both the first communication interface and the second communication interface are serial peripheral interface (SPI) communication interfaces or inter-integrated circuit (I2C) communication interfaces,
   the detection device is an optical mouse, and
   the raw data is configured for both
      calculating displacement of the detection device with respect to a working surface on which the detection device is operated, as the calculated data, and
      performing machine learning by the post processor using the raw data sent upon the detection device being lifted up from the working surface.

2. The detection system as claimed in claim 1, wherein the post processor and the detection device are arranged in the same equipment or respectively arranged in different equipment.

3. The detection system as claimed in claim 1, wherein the first request and the second request are standard communication protocols conforming to SPI standard or I2C standard, or self-defined protocols.

4. The detection system as claimed in claim 1, wherein the post processor is configured to, according to the raw data, perform the machine learning to perform material recognition of the working surface.

5. The detection system as claimed in claim 1, wherein the detection device further comprises a local processor configured to calculate the displacement, as the calculated data, according to the raw data.

6. The detection system as claimed in claim 1, wherein the detection device is further configured to send out the calculated data to the second communication interface of the post processor in the next polling period.

7. A detection system, comprising:
   a detection device, configured to send out, via a first communication interface included in the detection device, calculated data generated by the detection device, and send out, via the first communication interface included in the same detection device, raw data acquired by an optical sensor of the same detection device; and
   a post processor, comprising a first processor core and a second processor core, the first processor core being configured to transmit a first request, at a predetermined frequency, and a second request to the first communication interface of the detection device via a second communication interface included in the post processor to cause the detection device to transmit the calculated data in response to the first request and to transmit the raw data always in a next polling period of the second request upon the same detection device receiving the second request from the post processor,
   wherein the first processor core is configured to transmit the second request upon receiving a third request from the second processor core,
   both the first communication interface and the second communication interface are serial peripheral interface (SPI) communication interfaces or inter-integrated circuit (I2C) communication interfaces,
   the detection device is an optical mouse, and
   the raw data is configured for both
      calculating displacement of the detection device with respect to a working surface on which the detection device is operated, as the calculated data, and
      performing machine learning by the second processor core using the raw data sent upon the detection device being lifted up from the working surface.

8. The detection system as claimed in claim 7, wherein the post processor and the detection device are arranged in the same equipment or respectively arranged in different equipment.

9. The detection system as claimed in claim 7, wherein the first request, the second request and the third request are standard communication protocols conforming to SPI standard or I2C standard, or self-defined protocols.

10. The detection system as claimed in claim 7, wherein the second processor core is configured to transmit the third request to the first processor core only when the second processor core requires the raw data to perform the machine learning, and
   upon receiving the raw data from the detection device, the first processor core is configured to transmit the raw data to the second processor core to update the raw data therein.

11. The detection system as claimed in claim 10, wherein the second processor core of the post processor is configured to, according to the raw data, perform the machine learning to perform material recognition of the working surface.

12. The detection system as claimed in claim 7, wherein the detection device further comprises a local processor configured to calculate the displacement, as the calculated data, according to the raw data.

13. The detection system as claimed in claim 7, wherein the detection device is further configured to send out the calculated data to the second communication interface of the post processor in the next polling period.

14. A detection system, comprising:
a detection device, comprising:
a first communication interface, configured to send out, via a first communication interface included in the detection device, calculated data generated by the detection device, and send out, via the first communication interface included in the same detection device, raw data acquired by an optical sensor of the same detection device; and
a memory, configured to temporarily store the raw data; and
a post processor, configured to transmit a first request, at a predetermined frequency, and a second request to the first communication interface of the detection device via a second communication interface included in the post processor to cause the detection device to
transmit, via the first communication interface, the calculated data to the post processor in response to the first request,
store the raw data into the memory in response to the second request, and
transmit, via the first communication interface, a part of the raw data to the post processor respectively in response to multiple first requests transmitted always starting from a next polling period of the second request upon the same detection device receiving the second request from the post processor,
wherein both the first communication interface and the second communication interface are serial peripheral interface communication interfaces or inter-integrated circuit communication interfaces,
the detection device is an optical mouse, and
the raw data is configured for both
calculating displacement of the detection device with respect to a working surface on which the detection device is operated, as the calculated data, and
performing machine learning by the post processor using the raw data sent upon the detection device being lifted up from the working surface.

15. The detection system as claimed in claim 14, wherein the detection device is further configured to transmit, via the first communication interface, the calculated data in response to the multiple first requests.

16. The detection system as claimed in claim 14, wherein the first communication interface is further configured to read the part of the raw data from the memory in response to the multiple first requests, and the predetermined frequency is a fixed frequency.

17. The detection system as claimed in claim 14, wherein the post processor is configured to, according to the raw data, perform the machine learning to perform material recognition of the working surface.

18. The detection system as claimed in claim 14, wherein the detection device further comprises a local processor configured to calculate the displacement, as the calculated data, according to the raw data.

* * * * *